(12) United States Patent
Shroeder et al.

(10) Patent No.: US 12,099,271 B1
(45) Date of Patent: Sep. 24, 2024

(54) CONTROLLABLE LIGHT PROPAGATION SYSTEM

(71) Applicants: Volkswagen Aktiengesellschaft, Wolfsburg (DE); LensVector Inc., San Jose, CA (US)

(72) Inventors: Heiko Shroeder, Wolfsburg (DE); Tigran Galstian, San Jose, CA (US); Armen Zohrabyan, San Jose, CA (US)

(73) Assignees: VOLKSWAGEN AKTIENGESELLSCHAFT, Wolfsburg (DE); LENSVECTOR, San Jose, CA (US)

( * ) Notice: Subject to any disclaimer, the term of this patent is extended or adjusted under 35 U.S.C. 154(b) by 0 days.

(21) Appl. No.: 18/355,070

(22) Filed: Jul. 19, 2023

(51) Int. Cl.
*G02F 1/1335* (2006.01)
*G02F 1/133* (2006.01)
*G02F 1/1343* (2006.01)

(52) U.S. Cl.
CPC .... *G02F 1/133524* (2013.01); *G02F 1/13306* (2013.01); *G02F 1/134309* (2013.01); *G02F 1/13439* (2013.01)

(58) Field of Classification Search
None
See application file for complete search history.

(56) References Cited

U.S. PATENT DOCUMENTS

| | | | | |
|---|---|---|---|---|
| 5,953,469 A * | 9/1999 | Zhou | ............... | G02B 6/3522 385/22 |
| 6,108,059 A * | 8/2000 | Yang | ............... | G02B 6/0056 349/63 |
| 7,489,841 B2 | 2/2009 | Schilling | ............... | 385/37 |
| 7,592,988 B2 * | 9/2009 | Katase | ............... | G02F 1/1326 345/86 |
| 7,982,823 B1 * | 7/2011 | Feng | ............... | G02F 1/133602 349/65 |
| 8,456,514 B2 | 6/2013 | Leister | ............... | 348/40 |
| 2004/0105046 A1 * | 6/2004 | Taira | ............... | G02B 6/0053 349/61 |

(Continued)

FOREIGN PATENT DOCUMENTS

| | | | | |
|---|---|---|---|---|
| DE | 10160218 A1 | 8/2002 | ............... | G02B 6/00 |
| DE | 102009003069 A1 | 11/2010 | ............... | G02B 30/27 |
| WO | 2018/146326 A2 | 8/2018 | ............... | G02B 27/01 |

*Primary Examiner* — Ryan Crockett
(74) *Attorney, Agent, or Firm* — Slayden Grubert Beard PLLC

(57) ABSTRACT

A controllable light propagation system includes a light guide elongated in a first direction, a controllable liquid crystal (LC) element including an LC material and having a first side adjacent the light guide to define a dynamic interface between the light guide and controllable LC element, and an array of electrodes arranged at different locations along the first direction. The array of electrodes arranged along the first direction are selectively activatable to generate electric fields in the LC material to control a transmissivity of the dynamic interface between the light guide and the controllable LC element, thereby allowing a controlled extraction of light at selected locations along the light guide. An array of optical elements may be provided at a second side of the controllable LC element to deflect or otherwise influence the extracted light, e.g., as a function of the location of the extracted light along the first direction.

16 Claims, 10 Drawing Sheets

(56) References Cited

U.S. PATENT DOCUMENTS

| | | | |
|---|---|---|---|
| 2008/0007970 A1* | 1/2008 | Lee | G02B 6/0061 |
| | | | 385/129 |
| 2008/0165308 A1* | 7/2008 | Shiraishi | G02B 6/0055 |
| | | | 349/65 |
| 2010/0053992 A1* | 3/2010 | Krijn | G02B 6/0068 |
| | | | 362/609 |
| 2010/0188602 A1* | 7/2010 | Feng | G02B 6/3536 |
| | | | 349/62 |
| 2011/0169877 A1* | 7/2011 | Ishida | G02F 1/1334 |
| | | | 345/102 |
| 2012/0050148 A1* | 3/2012 | Huang | H04N 13/32 |
| | | | 345/102 |
| 2012/0098875 A1* | 4/2012 | Shinkai | G02B 6/0013 |
| | | | 362/613 |
| 2013/0088889 A1* | 4/2013 | Kim | G09F 13/18 |
| | | | 362/602 |
| 2013/0107164 A1* | 5/2013 | Verslegers | G02B 6/0065 |
| | | | 349/61 |
| 2013/0141937 A1* | 6/2013 | Katsuta | G02B 6/0035 |
| | | | 362/606 |
| 2019/0369403 A1 | 12/2019 | Leister | |
| 2020/0064686 A1* | 2/2020 | Jiang | G02F 1/133528 |

* cited by examiner

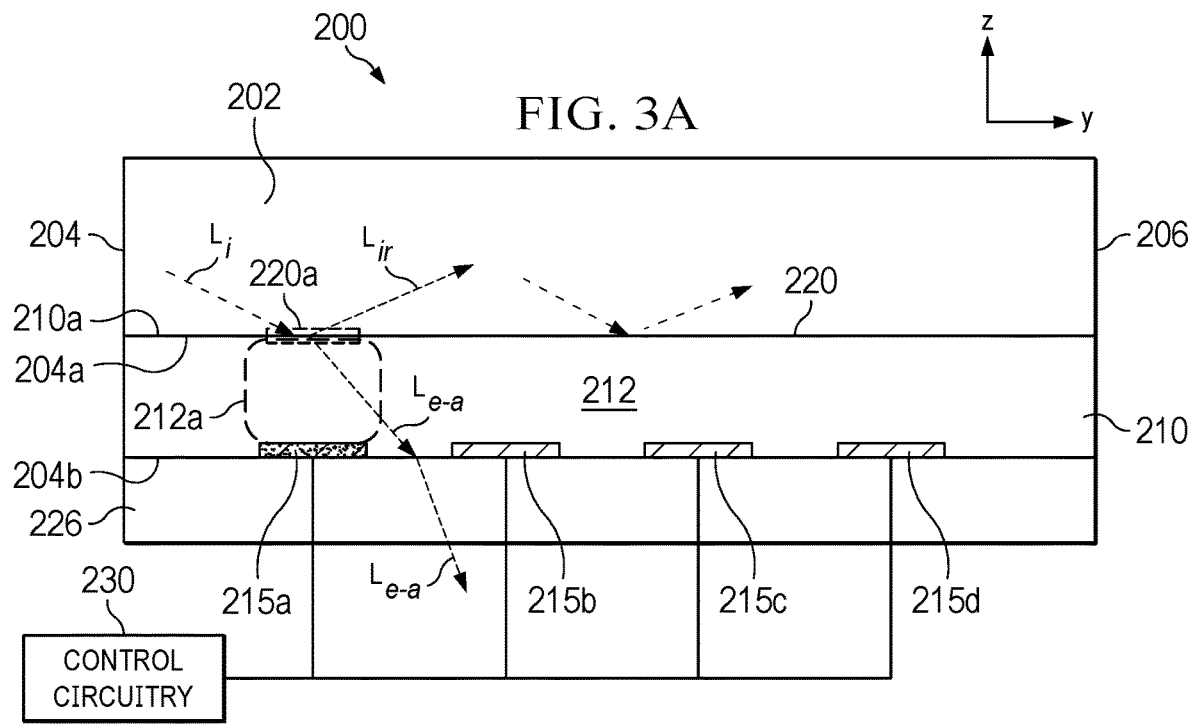
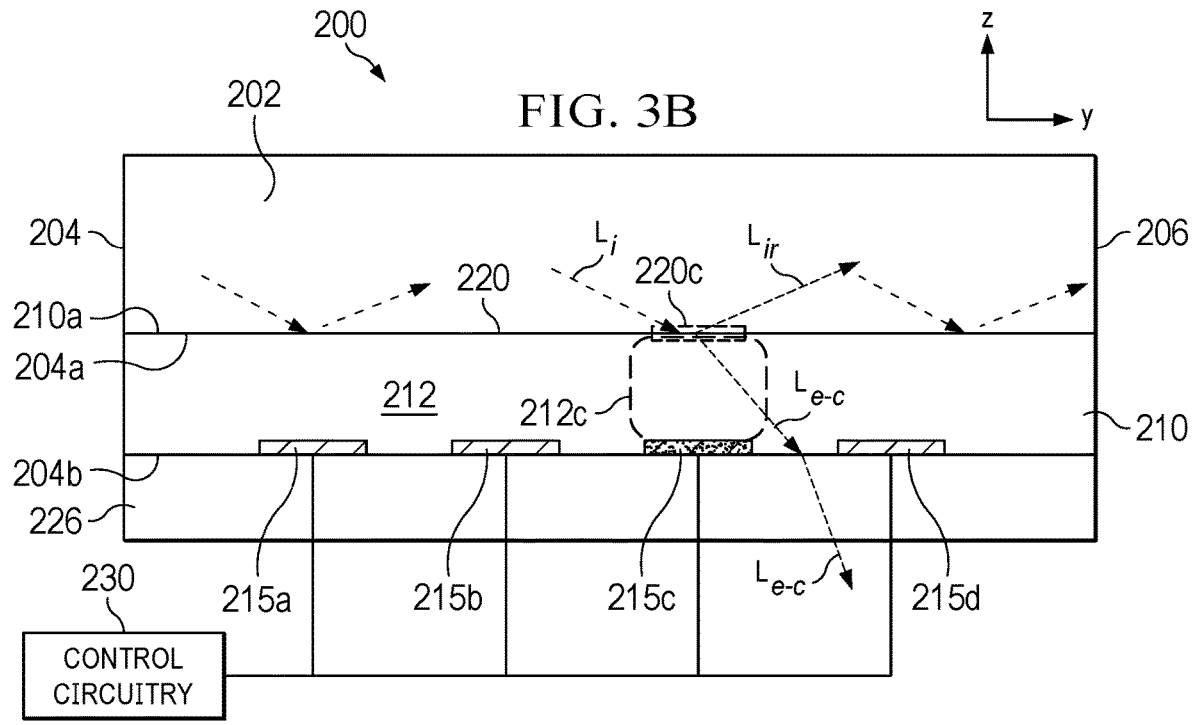

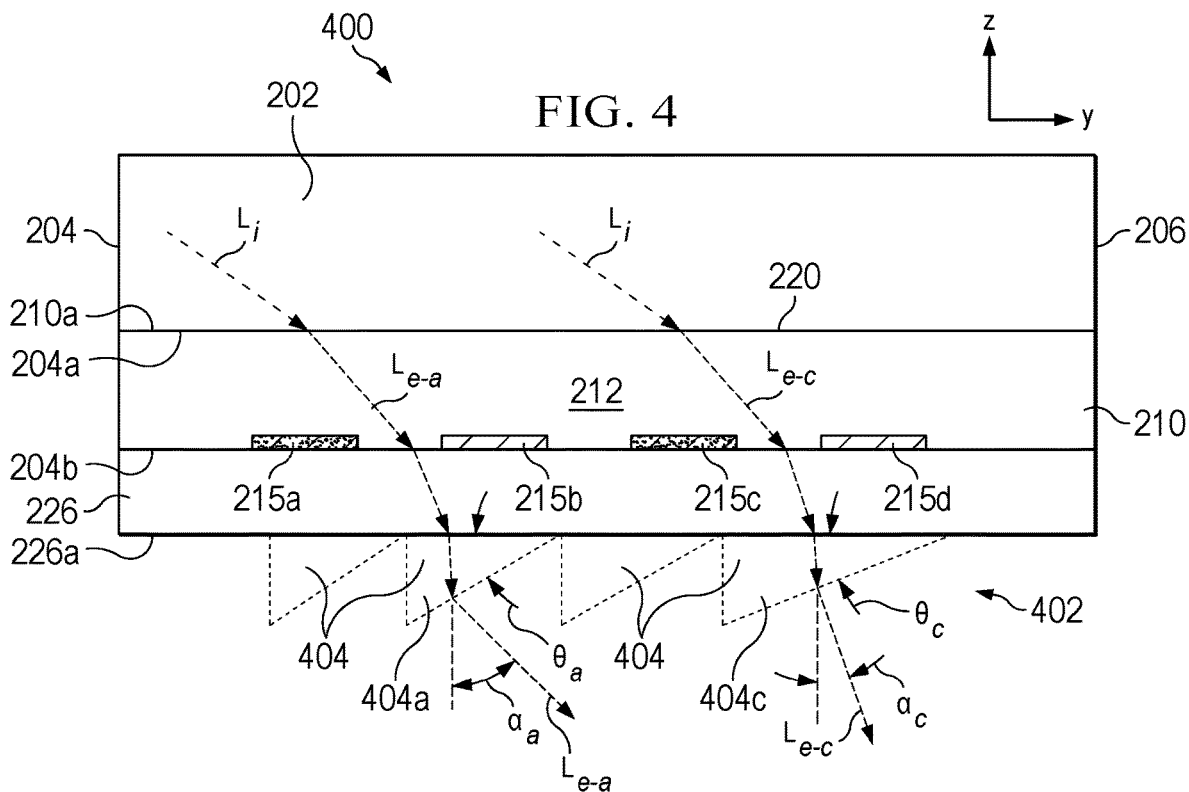
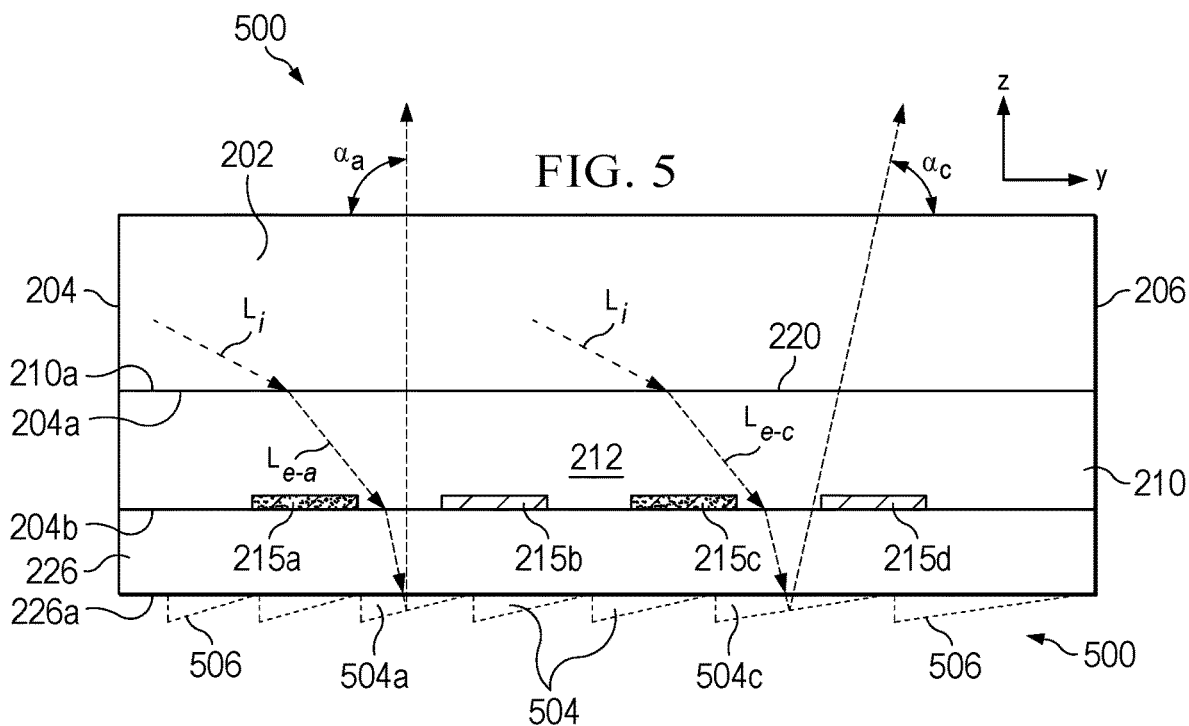

CONTROLLABLE LIGHT PROPAGATION SYSTEM

TECHNICAL FIELD

The present disclosure relates to light systems, and more particularly to a controllable light propagation system for dynamically controlling a propagation of light using a controllable liquid crystal element.

BACKGROUND

This background section is provided for the purpose of generally describing the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Controlled propagation of light is useful for many applications, for example in the areas of dynamic lighting, display devices, automotive applications, optogenetics, and augmented reality. Some lighting devices transmit light through a light guide and extract light from the light guide at a particular location and at a particular propagation angle or angles. A "light guide" may refer to any structure in which light may be propagated, e.g., wherein light is contained within the structure (as the light propagates along the structure) by internal reflection. As used herein, "extracting" light from a light guide structure means to allow or increase an amount of light transmission out of the light guide structure, e.g., by passing through an external surface of the light guide.

Some lighting devices, e.g., certain back light illumination devices, include an electrically controllable liquid crystal (LC) material activated by electrode(s) to control an extraction of light from a respective light guide. In some devices, activation of electrodes near the LC material may reorient the LC molecules, which may change a relative refractive index of the LC material ("LC refractive index"). This change in the LC refractive index may cause or influence an extraction of light from the light guide. For example, a transmissivity of an interface between the light guide and an adjacent structure (or air, etc.) may depend on the ratio of the LC refractive index ($n_{LC}$) to refractive index of the adjacent structure, e.g., according to the total internal reflection formula $\sin(i) \geq n_2/n_1$, wherein i represents the angle of incidence, $n_1$ represents the refractive index of the light guide, $n_2$ represents the refractive index of the adjacent structure (into which light may be extracted from the light guide), and wherein total internal reflection may be obtained only when $n_1 > n_2$.

FIG. 1A shows an example lighting device 100a including a cylindrical structure including an inner cylindrical core (light guide) 102a containing a liquid crystal (LC) material and an outer casing 104a formed from a transmissive material, e.g., glass or acrylic, defining an interface 106a between the inner cylindrical core 102a and outer casing 104a. The lighting device 100a may include an electrode 110a that may be energized to adjust the refractive index of the LC core 102a, which may alter a transmissivity of the interface 106a, thereby influencing an extraction of the light $L_{core}$ propagating along the LC core 102a. In this example the extracted light may escape in all radial directions, e.g., indicated by arrows $L_E$.

FIG. 1B shows an example lighting device 100b utilizing planar geometries, as opposed to the circular geometry of the example lighting device 100a discussed above. The example lighting device 100b includes an elongated rectangular LC core (e.g., channel waveguide) 102b and an outer casing 104b formed from a transmissive material, e.g., glass or acrylic, defining an interface 106b between the inner core 102b and outer casing 104b. The lighting device 100b may include an electrode 110b that may be energized to adjust the refractive index of the LC core 102b, which may alter a transmissivity of the interface 106b, thereby influencing an extraction of the light $L_{core}$ propagating along the LC core 102b. In this example the extracted light $L_E$ is directed in a common direction, e.g., upwardly, for example by providing reflective cladding on bottom and side surfaces of the inner core 102b.

The example lighting devices 100a and 110b shown in FIGS. 1A and 1B have various drawbacks and limitations. For example, using LC material for the core (e.g., cylindrical core 102a and channel type core 102b) typically introduces large losses due to absorption and scattering properties of LC materials. In addition, the location and direction of light extraction in lighting devices 100a and 110b is static, which may be unsuitable for particular applications.

Based on the above, an object exists to provide more dynamically controllable light systems, e.g., for dynamically controlling the location, direction, quantity and/or other property of propagated light.

SUMMARY

The object is solved by the subject matter of the independent claims. The dependent claims and the following description describe various embodiments of the invention.

One aspect provides a controllable light propagation system including a light guide elongated in a first direction, a controllable LC element including an LC material and having a first side adjacent a first side of the light guide to define a dynamic interface between the light guide and the controllable LC element, and a first array of electrodes arranged at different locations along the first direction. Respective electrodes of the first array of electrodes at different locations along the first direction are selectively activatable to selectively influence associated regions of the LC material at different locations along the first direction to selectively control a transmissivity of the dynamic interface at different locations along the first direction, thereby allowing a selective extraction of light from the light guide at different locations along the first direction.

In some embodiments, a transmissive state of the dynamic interface allows an extraction of light from the light guide into the controllable LC element through the first side of the controllable LC element and out of the controllable LC element through a second side of the controllable LC element opposite the first side of the controllable LC element.

In some embodiments, the first array of electrodes includes (a) a first electrode at a first electrode location and (b) a second electrode at a second electrode location downstream of the first electrode location along the first direction; the first electrode is selectively activatable to control a first electric field influencing a first region of the LC material to thereby control a transmissivity of a first region of the dynamic interface; and the second electrode is selectively activatable to control a second electric field influencing a second region of the LC material downstream of the first region of the LC material along the first direction, to thereby control a transmissivity of a second region of the dynamic interface downstream of the first region of the dynamic interface.

In some embodiments, respective electrodes in the first array of electrodes are independently activatable.

In some embodiments, the first array of electrodes includes transparent electrodes allowing transmission of light therethrough.

In some embodiments, the first array of electrodes are arranged on the second side of the controllable LC element.

In some embodiments, the controllable light propagation system includes a second array of selectively activatable electrodes arranged along the first direction on the first side of the controllable LC element.

In some embodiments, the controllable light propagation system includes an array of optical elements arranged along the first direction, wherein the array of optical elements are configured to influence light extracted from the light guide.

In some embodiments, the array of optical elements are configured to deflect light received from the second side of the controllable LC element.

In some embodiments, the array of optical elements are configured to reflect the extracted light back through the controllable LC element.

In some embodiments, respective optical elements in the array of optical elements at different locations along the first direction induce different optical influence on incident light, such that light extracted from the light guide and incident on a respective optical element is optically influenced as a function of a respective location of the respective optical element along the first direction.

In some embodiments, the array of optical elements arranged along the first direction includes different optical elements that deflect incident light by different degrees, such that light extracted from the light guide and incident on respective optical elements in the array of optical elements is deflected by a variable degree as a function of a location of the extracted light along the first direction.

In some embodiments, the array of optical elements includes (a) a first optical element adjacent the second side of the controllable LC element at a first optical element location, and (b) a second electrode adjacent the second side of the controllable LC element at a second optical element location downstream of the first optical element location along the first direction. The first optical element may be configured to deflect extracted light received from the controllable LC element by a first angular degree, and the second optical element may be configured to deflect extracted light received from the controllable LC element by a second angular degree different than the first angular degree.

In some embodiments, the light guide is free of LC material.

Another aspect provides a controllable light propagation system including a light guide elongated in a first direction, a controllable LC element including an LC material and having a first side adjacent a first side of the light guide to define a dynamic interface between the light guide and the controllable LC element, a first array of electrodes including (a) a first electrode at a first electrode location and (b) a second electrode at a second electrode location downstream of the first electrode location along the first direction. The first electrode may be selectively activatable to influence a first region of the LC material to extract a first light beam from the light guide into the controllable LC element via the dynamic interface, at a first location along the first direction; and the second electrode may be selectively activatable to influence a second region of the LC material to extract a second light beam from the light guide into the controllable LC element via the dynamic interface, at a second location downstream of the first location along the first direction.

In some embodiments, the controllable light propagation system includes an array of optical elements adjacent the second side of the controllable LC element and arranged along the first direction, the array of optical elements including (a) a first optical element at a first optical element location and (b) a second optical element at a second optical element location downstream of the first optical element location along the first direction. The first optical element at the first optical element location may be configured to receive the extracted first light beam from the controllable LC element and deflect the extracted first light beam by a first angular degree, and the second optical element at the second optical element location may be configured to receive the extracted second light beam from the controllable LC element and deflect the extracted second light beam by a second angular degree different than the first angular degree.

In some embodiments, the controllable light propagation system includes control circuitry to selectively activate respective electrodes in the first array of electrodes to control an extraction of light at different locations along the light guide in the first direction.

In some embodiments, the controllable light propagation system includes control circuitry to control a voltage to a respective electrode in the first array of electrodes to effect a partial extraction of light, with an internal reflection in the light guide of non-extracted light, at a selected location along the first direction.

Another aspect provides a method for controlling light propagation, including operating a controllable light propagation system including a light guide elongated in a first direction, a controllable LC element including an LC material and having a first side adjacent a first side of the light guide to define a dynamic interface between the light guide and the controllable LC element, and a first array of electrodes arranged at different locations along the first direction. The method includes using a controller to selectively activate respective electrodes of the first array of electrodes at different locations along the first direction to selectively influence associated regions of the LC material at different locations along the first direction to selectively control a transmissivity of the dynamic interface at different locations along the first direction, thereby effecting a selective extraction of light from the light guide at different locations along the first direction.

In some embodiments, the controllable light propagation system includes (a) a first optical element at a first optical element location and configured to deflect extracted light by a first angular degree, and (b) a second optical element at a second optical element location downstream of the first optical element location along the first direction and configured to deflect extracted light by a second angular degree different than the first angular degree. The method may include (a) at a first time, using the controller to selectively activate at least one first electrode of the array of electrodes to effect a selective extraction of light from the light guide at a first location associated with the first optical element location, wherein the first optical element deflects the extracted light by the first angular degree; and (b) at a second time after the first time, using the controller to selectively activate at least one second electrode of the array of electrodes to effect a selective extraction of light from the light guide at a second location associated with the second optical element location, wherein the second optical element deflects the extracted light by the second angular degree.

The details of one or more embodiments are set forth in the accompanying drawings and the description below. Other features will be apparent from the description, drawings, and from the claims.

BRIEF DESCRIPTION OF THE DRAWINGS

Example aspects of the present disclosure are described below in conjunction with the figures, in which:

FIGS. 3A and 3B are cross-sectional side views of the controllable light propagation system of FIGS. 2A-2B, showing selective electrode activation to control a location of light extraction, according to one embodiment;

FIG. 4 is a cross-sectional side view of the controllable light propagation system of FIGS. 2A-2B, including example transmissive optics for selective directional control of extracted light, according to one embodiment;

FIG. 5 is a cross-sectional side view of the controllable light propagation system of FIGS. 2A-2B, including example reflective optics for selective directional control of extracted light, according to one embodiment;

Figure 1A:
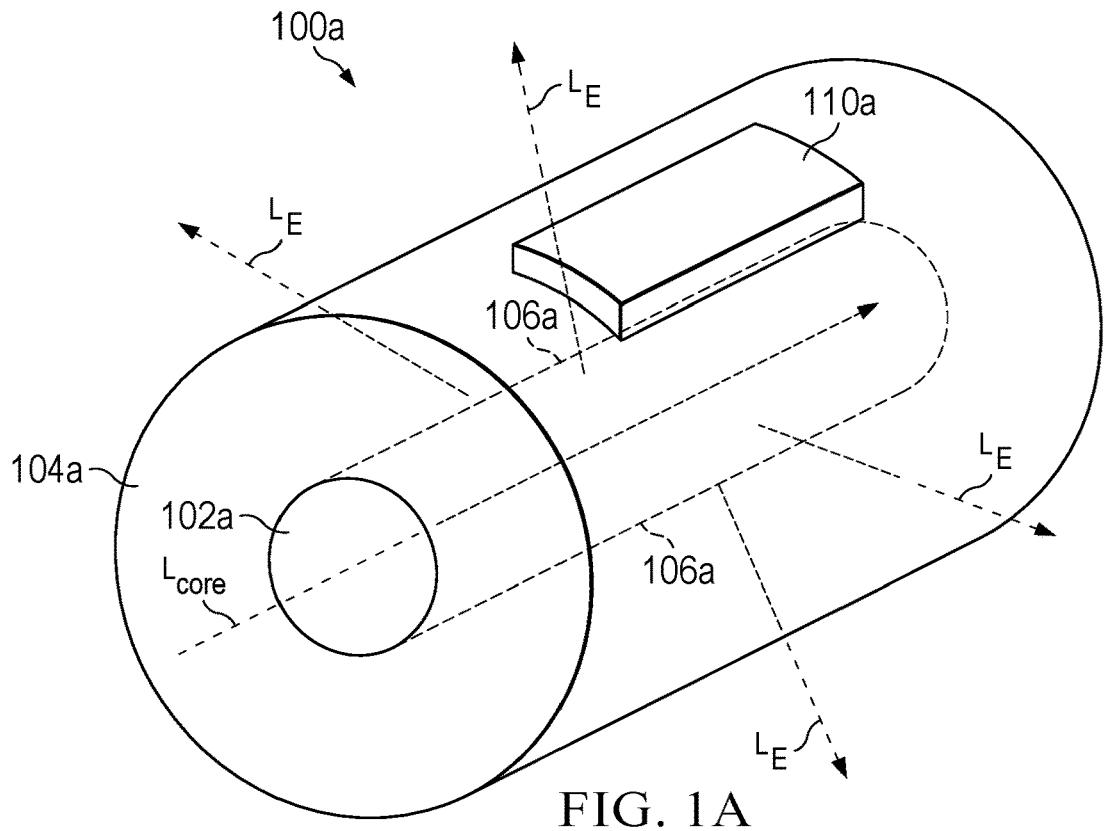
FIG. 1A shows an example prior art lighting device including a cylindrical core (light guide) comprising an LC material.
Figure 1B:
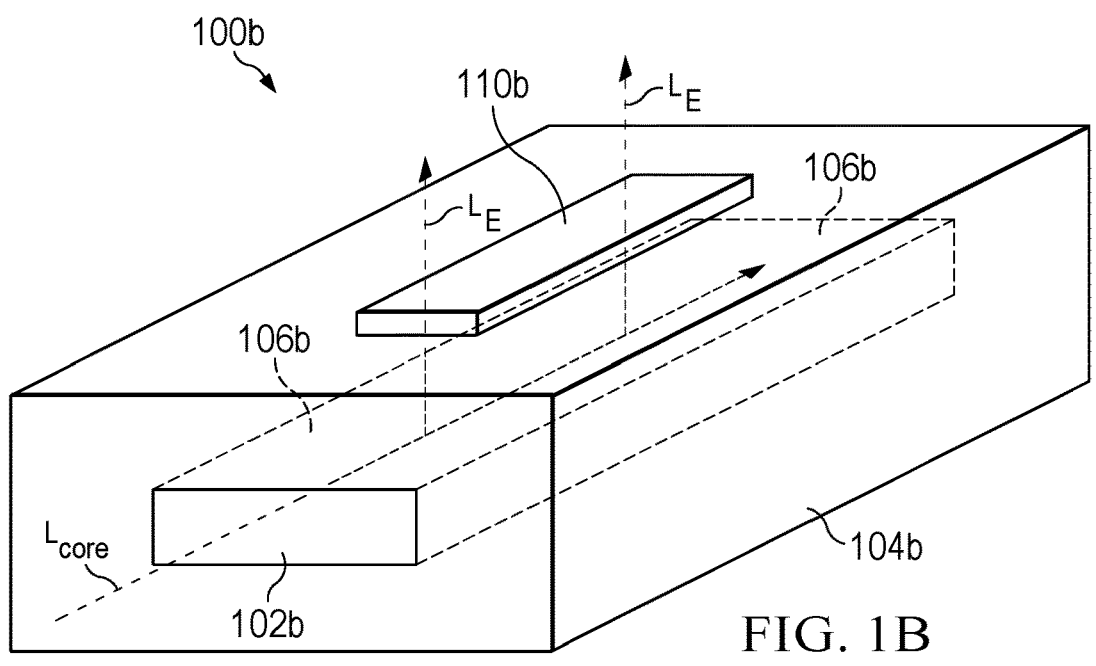
FIG. 1B shows an example prior art lighting device including a rectangular core (channel waveguide) comprising an LC material.

It should be understood the reference number for any illustrated element that appears in multiple different figures has the same meaning across the multiple figures, and the mention or discussion herein of any illustrated element in the context of any particular figure also applies to each other figure, if any, in which that same illustrated element is shown.

DETAILED DESCRIPTION

Specific embodiments of the invention are here described in detail, below. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

According to a first example aspect, a controllable light propagation system includes a light guide elongated in a first direction, a controllable LC element including an LC material adjacent the light guide, and an array of controllable electrodes.

The controllable LC element (e.g., comprising a planar solid, a rectangular prism, or any other suitable shape) may be arranged with a first side adjacent a first side of the light guide to define a dynamic interface between the light guide and the controllable LC element. The array of electrodes may be arranged along the first direction on a second side of the controllable LC element opposite the first side of the controllable LC element. Respective electrodes of the array of electrodes are selectively activatable to control a respective electric field influencing respective regions of the LC material of the controllable LC element to control a transmissivity of the dynamic interface between the light guide and the controllable LC element, thereby allowing a controlled extraction of light (from the light guide into the controllable LC element through the first side of the controllable LC element and out of the controllable LC element through the second side of the controllable LC element) at different locations along the light guide in the first direction.

The array of electrodes may include, for example, a first electrode at a first electrode location and a second electrode at a second electrode location downstream of the first electrode location along the first direction. The first electrode may be selectively activatable to control a first electric field influencing a first region of LC material of the controllable LC element to thereby control a transmissivity of a first region of the dynamic interface, and the second electrode may be selectively activatable to control a second electric field influencing a second region of the LC material of the controllable LC element downstream of the first region of the LC material along the first direction, to thereby control a transmissivity of a second region of the dynamic interface downstream of the first region of the dynamic interface.

Individual electrodes, or subsets of electrodes, in the array of electrodes, may be independently activatable, to thereby allow independent control of light extraction at different locations along the light guide. Respective electrodes may be activated by applying or adjusting respective voltages to the respective electrodes.

As used herein, a "controllable light propagation system" refers to a system capable to propagate light in a controllable manner, wherein at least one parameter of light propagation (e.g., location, direction, intensity, focus, polarization, diffusion, divergence/convergence angle, etc.) is dynamically controllable. A controllable light propagation system as disclosed herein may be used in various applications, e.g., dynamic lighting systems, display devices, LIDAR systems, automotive systems, optogenetics, and augmented reality, without limitation.

In addition, the term "light" as used herein refers to various wavelengths of radiation in the electromagnetic spectrum, for example including visible light, infrared, ultraviolet, etc.

In some embodiments, the controllable light propagation system includes an array of optical elements arranged along the first direction adjacent the second side of the controllable LC element such that the controllable LC element is arranged between the light guide and the array of optical elements. The array of optical elements may be configured to influence light extracted from the light guide, e.g., including light extracted at different locations along the light guide. The optical elements may include elements to deflect (i.e., influence a propagation direction of) extracted light, for example transmissive elements that direct extracted light in a particular direction and/or reflective elements that reflect extracted light back through the controllable LC element.

In some embodiments, the array of optical elements includes optical elements arranged at different locations along the first direction that impart different optical effects (e.g., directional steering, focusing, filtering, polarizing, diverging, converging, collimating, etc.) on light extracted at the respective locations along the first direction, such that different optical effects of light extracted from the light guide may be achieved by selecting the location of light extraction along the light guide (e.g., by selective activation of associated electrodes at different locations along the light guide).

In some embodiments the array of optical elements includes optical elements arranged along the first direction that impart different directional steering of light extracted at the respective locations along the light guide, such that a direction of light emitted by (extracted from) the LC element may be controlled by controlling the location of light extraction along the light guide. For example, the array of optical elements may include a first optical element adjacent the second side of the controllable LC element at a first optical element location, and a second electrode adjacent the second side of the controllable LC element at a second optical element location downstream of the first optical element location along the first direction, wherein the first optical element is configured to deflect extracted light by a first angular degree, and the second optical element is configured to deflect extracted light by a second angular degree different than (less than or greater than) the first angular degree.

In some embodiments, the light guide comprises acrylic, glass, or other highly transmissive material. In some embodiments, the light guide is free of LC material, e.g., in contrast with certain conventional devices that utilize LC material for the light guide, to thereby reduce losses associated with such conventional devices (e.g., due to scattering properties of LC materials).

According to another example aspect, a controllable light propagation system includes a light guide elongated in a first direction, a controllable LC element (including LC material) having a first side adjacent a first side of the light guide to define a dynamic interface between the light guide and the controllable LC element; and an array of electrodes arranged on a second side of the controllable LC element opposite the first side of the controllable LC element, including (a) a first electrode at a first electrode location and (b) a second electrode at a second electrode location downstream of the first electrode location along the first direction. The first electrode is selectively activatable to influence a first region of the LC material to extract a first light beam from the light guide into the controllable LC element via the dynamic interface, at a first location along the first direction; and the second electrode is selectively activatable to influence a second region of the LC material to extract a second light beam from the light guide into the controllable LC element via the dynamic interface, at a second location downstream of the first location along the first direction.

In some embodiments, the controllable light propagation system includes an array of optical elements adjacent the second side of the controllable LC element and arranged along the first direction, including (a) a first optical element at a first optical element location and (b) a second electrode at a second optical element location downstream of the first optical element location along the first direction. The first optical element at the first optical element location is configured to receive the extracted first light beam from the controllable LC element and deflect the extracted first light beam by a first angular degree, and the second optical element at the second optical element location is configured to receive the extracted second light beam from the controllable LC element and deflect the extracted second light beam by a second angular degree different than the first angular degree.

The controllable light propagation system may include control circuitry to selectively activate the array of electrodes, e.g., by applying and dynamically adjusting respective voltages to selected electrodes, to control an extraction of light at different locations along the light guide in the first direction.

Figure 2A:
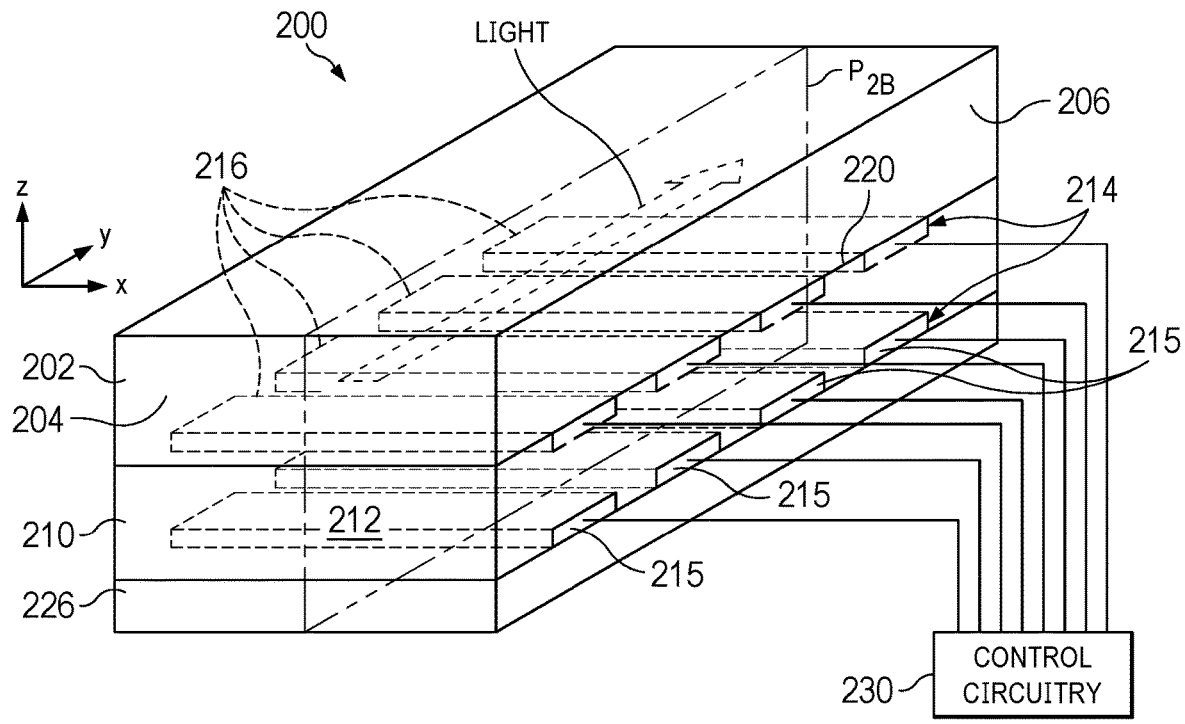
FIG. 2A is a three-dimensional view.
Figure 2B:
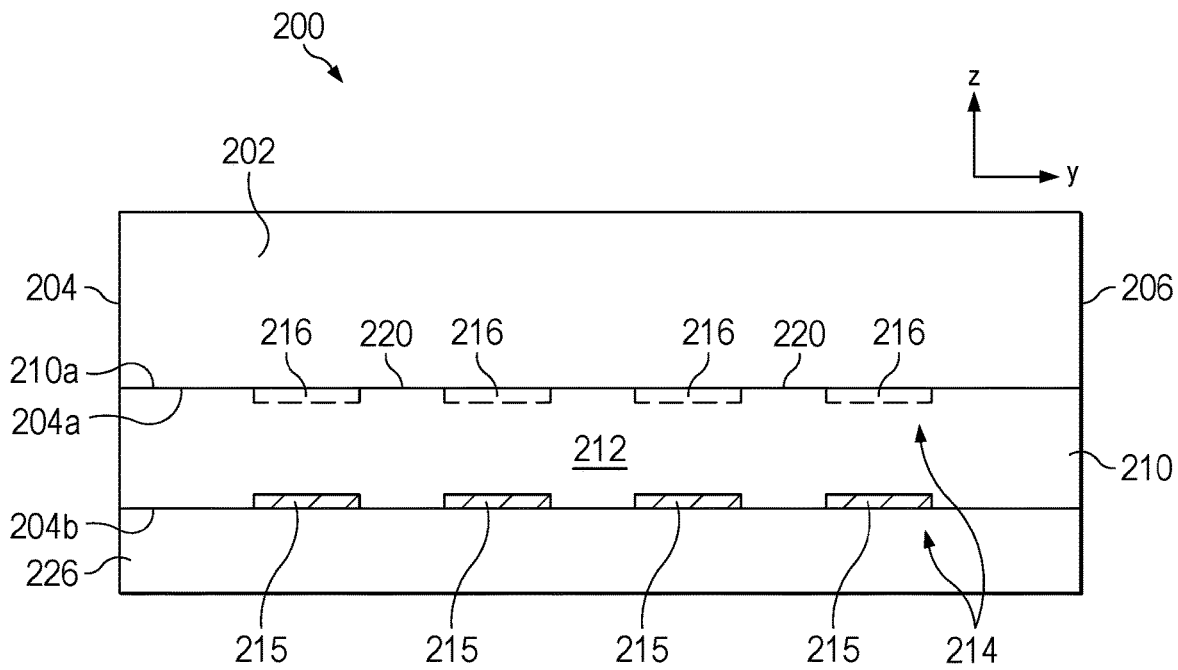
FIG. 2B is a cross-sectional side view, of an example controllable light propagation system according to one embodiment of the present disclosure.

FIG. 2A is a three-dimensional view, and FIG. 2B is a cross-sectional side view through plane $P_{2B}$ shown in FIG. 2A, of an example controllable light propagation system 200 (or simply "light system 200" for convenience) according to one embodiment of the present disclosure. The example light system 200 includes a light guide 202 elongated in a first direction (the y-direction shown in FIGS. 2A and 2B) from a first end 204 to a second end 206, a controllable LC element 210 including an LC material 212, and a set of selectively controllable electrodes 214 for influencing respective regions of the LC material 212.

In this example, the light guide 202 has a channel waveguide shape (e.g., having a rectangular cross-section perpendicular to the direction of elongation); however in other embodiments the light guide 202 may have a planar waveguide shape, a cylindrical shape, or any other suitable shape. The light guide 202 may be formed from an acrylic, glass, a polycarbonate, polyethylene terephthalate (PET), polyethylene terephthalate glycol (PETG), ZEONEX (cyclic olefin polymer (COP) grade polymer), or other highly transmissive material. For example, the light guide 202 may exhibit less than 5% loss per cm, less than 1% loss per cm, or less than 0.1% loss per cm, e.g., depending on the particular material, light guide geometry, etc.

The LC element 210 may include any suitable type of LC material 212, for example nematic liquid crystals. In some embodiments, the LC material 212 may comprise dual frequency nematic liquid crystals, e.g., for a desired orientation control of the LC molecules by electrode activation. In some embodiments, a refractive index of the LC element 210 is lower than the light guide 202 in an unexcited state of the LC molecules, i.e., unexcited by respective electrode(s) 214, but may be increased relative to the light guide 202 (e.g., matching or exceeding the refractive index of the light guide 202) by activation of respective electrode(s) 214.

The controllable LC element 210 has a first side 210a (see FIG. 2B) adjacent a first side 202a of the light guide to define a dynamic interface 220 between the light guide 202 and the controllable LC element 210. As discussed below, the dynamic interface 220 may be reflective (containing light within the light guide 202) in the absence of electrode activation, and may become partially or fully transmissive in response to relevant electrode activation that influences a refractive index of the controllable LC element 210. The controllable LC element 210 may be formed directly in contact with the light guide 202 to define the dynamic interface 220. Alternatively, one or more layers or other intervening structures may be formed between the controllable LC element 210 and the light guide 202, wherein the dynamic interface between the LC element first side 210a and the light guide first side 202a includes such intervening structures.

As shown, the light system 200 may optionally include an outer substrate 226 on the second side 210b of the LC element 210, e.g., to physically support and/or protect the LC element 210. In some embodiments, the outer substrate 226 may be formed from an acrylic, glass, polycarbonate, PET, PETG, ZEONEX, or other highly transmissive material.

The set of selectively controllable electrodes 214 (also referred to simply as electrodes 214 for convenience) may include at least one array of electrodes arranged along the first direction (y-direction). As shown in FIGS. 2A and 2B, electrodes 214 may include an array of electrodes 215 arranged along the first direction on a second side 210b of the LC element 210 facing away from the light guide 202. In some embodiments, electrodes 214 may alternatively (instead of electrodes 215 arranged on the second side 210b of the LC element 210) or additionally (in addition to electrodes 215 arranged on the second side 210b of the LC element 210) include an array of electrodes 216 arranged along the first direction (y-direction) on the first side 210a of the LC element 210 facing the light guide 202.

As used herein, an electrode arranged "on" a particular side of an element (e.g., electrodes 215 arranged on the second side 210b (see FIG. 2B) of the LC element 210, or electrodes 216 arranged on the first side 210a of the LC element 210) may include (a) the electrode arranged on an outer surface of the element (at the particular side of the element), or (b) the electrode partially or fully embedded in the element at the particular side of the element (e.g., wherein an outer surface of the electrode is flush with the outer surface of the element, or spaced apart from the outer surface of the element toward an interior of the element, or wherein the electrode partially projects from the outer surface of the element), or (c) the electrode otherwise located in, on, adjacent, or proximate the particular side of an element. For example, as shown in FIGS. 2A-7F, electrodes 215 arranged on the second side 210b of the LC element 210 are embedded in the LC element 210 at the second side 210b, and optional electrodes 216 arranged on the first side 210a of the LC element 210 are embedded in the LC element 210 at the first side 210a. In other example embodiments, electrodes 215 and/or electrodes 216 may be mounted on respective outer surfaces of the LC element 210 (and either embedded in the adjacent light guide 202 and/or outer substrate 226, or sandwiched between the LC element 210 and the adjacent light guide 202 and/or outer substrate 226, for example).

In some embodiments, a controllable light propagation system may include electrodes arranged on only one side of the LC element. For example, light system 200 may include electrodes 215 arranged only on the second side 210b of the LC element 210, without electrodes 214 (e.g., electrodes 216) on any other side of the LC element 210. The drawings after FIGS. 2A-2B (FIGS. 3A through 7F) show an example of such configuration, i.e., showing electrodes 215 arranged on the second side 210b of the LC element 210, but not electrodes 216 on the first side 210a of the LC element 210. However, it should be understood this represents only one example configuration; a light system according to the present disclosure may alternatively or additionally include electrodes 216 on the first side 210a of the LC element 210, and/or electrodes arranged on other side(s) or locations of the respective light systems.

Control circuitry 230 may be connected to respective electrodes 214 (e.g., including electrodes 215 and/or electrodes 216) to activate, deactivate, or otherwise control respective electrodes 214 (e.g., by controlling respective voltages applied to respective electrodes 214) to selectively influence a transmissivity of the dynamic interface 220 between the light guide 202 and LC element 210, e.g., to effect or control an extraction of light) at selected locations along the first direction. For example, control circuitry 230 may include circuitry to selectively activate respective electrodes 215 (e.g., individual electrodes 215 or subsets of electrodes 215) to control (e.g., generate or influence) a respective electric field that influences a respective region of the LC material 212 of the controllable LC element 210 to control a transmissivity of the dynamic interface 220 at an area corresponding with the influenced region of the LC material 212, to thereby allow a controlled extraction of light at selected location(s) along the light guide 202 in the first direction.

In some embodiments, control circuitry 230 may include IC circuitry to generate and adjust respective voltages applied to respective electrodes 214, e.g., using the form of a square wave or sine wave AC current (in some embodiments, without a residual DC component). For example, the control circuitry 230 may include a (1-n Bit) digital to analog converter (DAC) to generate and adjust voltages for respective electrodes 214. In some embodiments, the control circuitry 230 may control the RMS (root mean square) voltage and frequency applied to each respective electrode 214. The control circuitry 230 may include a switchable analog inverter to switch the polarity of respective applied voltages (i.e., applied to respective electrodes 214) at a given frequency, or pulse width modulation (PWM) signal generation circuitry to control the RMS voltage by digital signal modulation. In some embodiments, the control circuitry 230 may include a CPU (e.g., MCU) to receive and process specified electrode control information (for controlling respective electrodes 214), and control the DAC and switch the polarity of respective analog signals at specified frequencies.

More particularly, activating each respective electrode may reorient LC molecules in a local region of the LC material 212 near the respective electrode, which may change (e.g., increase or decrease) a refractive index of the local region of LC material 212 ("local LC refractive index $n_{LC}$"). This change in the refractive index of the local region of LC material 212, relative to a refractive index of the light guide 202 ("light guide refractive index $n_c$"), may alter a transmissivity of the dynamic interface 220 between the light guide 202 and LC element 210 in an area proximate the local region of LC material 212 affected by the activated electrode. For example, varying the local LC refractive index $n_{LC}$ (by selective electrode activation) may affect the transmissivity of the dynamic interface 220 according to the total internal reflection formula: $\sin(i) \geq n_{LC}/n_c$, wherein i represents an angle of incidence of light at the dynamic interface 220. For example, where the local LC refractive index $n_{LC}$ is lower than the light guide refractive index $n_c$ in an un-activated state of the respective electrode, activating the respective electrode to increase the local LC refractive index $n_{LC}$ may overcome the total internal reflection condition ($\sin(i) \geq n_{LC}/n_c$) for light in the light guide 202, thereby allowing or increasing an extraction of light through the dynamic interface 220 in the area near the local region of LC material 212.

FIGS. 3A and 3B are cross-sectional side views of the example dynamically controllable light system 200 of FIGS. 2A-2B, showing selective electrode activation to control a location of light extraction, according to one embodiment. In particular, FIG. 3A and FIG. 3B illustrate selective activation of two example electrodes 215 and the resulting effects on light passing through the light guide 202.

As shown in FIG. 3A, the array of electrodes 215 may include an including four example electrodes 215a-215d arranged on the second side 210b of the LC element 210 along the first direction (y-direction). In the operational state shown in FIG. 3A, control circuitry 230 selectively activates electrode 215a to create or alter an electric field that influences a local region 212a of the LC material 212 ("local LC region 212a") adjacent electrode 215a, in particular by reorienting LC molecules in the local LC region 212a, to alter (e.g., increase or decrease) a refractive index of the local LC region 212a. The altered refractive index of the local LC region 212a may influence a transmissivity of the dynamic interface 220 between the light guide 202 and LC element 210 in an interface area 220a proximate the local LC region 212a, which may allow an extraction of at least a portion of incident light $L_i$ at the interface area 220a (i.e., transmission of at least a portion of the incident light $L_i$ through the dynamic interface 220), indicated as extracted light $L_{e-a}$.

Another portion of the incident light $L_i$ may be internally reflected, as indicated by $L_{ir}$, except in a situation of full (100%) light extraction. Incident light at other areas of the dynamic interface 220, i.e., other than the interface area 220a influenced by the activation of electrode 215a, may be internally reflected ($L_{ir}$) and continue along the light guide 202 in the first direction (y-direction).

In this manner, light may be selectively extracted at a particular location along the light guide 202, in particular a location associated with the activated electrode 215a. In addition, a voltage applied to electrode 215a may be selectively controlled to alter a transmissivity of the dynamic interface 220, to thereby control an amount (e.g., percentage) of the incident light $L_i$ transmitted as extracted light $L_{e-a}$ versus reflected as internally reflected light $L_{ir}$.

In contrast, FIG. 3B shows an operational state in which the control circuitry 230 selectively activates electrode 215c (downstream of electrode 215a) to create or alter an electric field that influences a local region 212c of the LC material 212 ("local LC region 212c") adjacent electrode 215c (by reorienting LC molecules in the local LC region 212c) to alter a refractive index of the local LC region 212c. The altered refractive index of the local LC region 212c may influence a transmissivity of an interface area 220c (downstream of the of the interface area 220a) proximate the local LC region 212c, which may allow an extraction of at least a portion of incident light $L_i$ at the interface area 220c, indicated as extracted light $L_{e-c}$. Another portion of the incident light $L_i$ may be internally reflected, as indicated by $L_{ir}$, except in a situation of full (100%) light extraction. Incident light at other areas of the dynamic interface 220, i.e., other than the interface area 220c influenced by the activation of electrode 215c, may be internally reflected ($L_{ir}$) and continue along the light guide 202 in the first direction (y-direction).

In this manner, light may be selectively extracted at a location associated with the activated electrode 215c, downstream of the light extraction location shown in FIG. 3A (i.e., an extraction location associated with electrode 215a).

FIG. 4 is a cross-sectional side view of a controllable light propagation system 400 (or "light system 400" for convenience) including the example light system 200 shown in FIGS. 2A-2B, and including an example optics system 402 for selectively steering extracted light. The example optics system 402 includes an array of optical elements 404 arranged along the first direction (y-direction), wherein different optical elements 404 steer incident light $L_i$ in different directions (e.g., by deflecting incident light $L_i$ by different degrees), such that light extracted from the LC element 210 and incident on respective optical elements 404 is steered (e.g., deflected) as a function of a location along the first direction (y-direction) at which the light is extracted from the LC element 210. In the illustrated example, the array of optical elements 404 are arranged on or adjacent an outer side 226a of the outer substrate 226. In other embodiments, the array of optical elements 404 may be arranged on or adjacent the second side 204b of the LC element 210, or otherwise arranged to receive extracted light from the light guide 202.

In this example, the array of optical elements 404 comprises an array of transmissive prisms, arranged along the first direction (y-direction), having a progressively decreasing prism angle θ, providing a progressively decreasing propagation angle α (with respect to normal from first direction (y-direction). For example, as shown in FIG. 4, the array of optical elements 404 includes (a) an optical element (prism) 404a arranged at a first optical element location along the first direction, corresponding with extracted light light $L_{e-a}$ extracted by activation of electrode 215a (as discussed above with respect to FIG. 3A) and (b) an optical element (prism) 404c arranged at a second optical element location downstream of the optical element 404a along the first direction, corresponding with extracted light light $L_{e-c}$ extracted by activation of electrode 215c (as discussed above with respect to FIG. 3B). The optical element 404a has a prism angle $θ_a$ that steers extracted light light $L_{e-a}$ along a propagation angle $α_a$, whereas the optical element 404c has a prism angle $θ_c$ that steers extracted light $L_{e-c}$ along a propagation angle $α_c$ less than the propagation angle as of extracted light light $L_{e-a}$ steered by optical element 404a.

In this manner, the light system 400 may selectively and dynamically steer extracted light along any of multiple different directions, e.g., corresponding with different optical elements 404 for steering light extracted at different locations along the light guide 202, e.g., concurrently or at different times, by selective activation of electrodes 215 (e.g., electrodes 215a-215d) arranged along the light guide 202. For example, control circuitry 230 may activate electrodes 215a and 215c concurrently, to extract and propagate respective portions of incident light $L_i$ along propagation angles $α_a$ and $α_c$. Control circuitry 230 may independently activate electrodes 215a and 215c with similar or different voltages, e.g., to control a respective amount of extracted light light $L_{e-a}$ relative to extracted light $L_{e-c}$ and propagate respective portions of incident light $L_i$ along propagation angles $α_a$ and $α_c$. As another example, control circuitry 230 may selectively activate electrode 215a at a first time (e.g., without activating electrode 215c), to extract incident light $L_i$ and propagate extracted light light $L_{e-a}$ along propagation angle $α_a$, and subsequently selectively activate electrode 215c at a second time (e.g., without activating electrode 215a), to extract and incident light $L_i$ and propagate extracted light light $L_{e-c}$ along propagation angle $α_c$.

Although the example optics system 402 includes different optical elements 404 for selectively steering extracted light as a function of the location along the light guide 202 at which light is selectively extracted, in other embodiments the optics system 402 or similar optics system may include an array of optical elements arranged at different locations along the first direction to selectively induce any other type or types of optical influence on extracted light as a function of the location of the extracted light along the first direction (i.e., as a function of the location of the respective optical element receiving and influencing the extracted light).

For example, optics system 402 or similar optics system may include an array of optical elements arranged at different locations along the first direction and configured to induce a different focus (e.g., focal point) of extracted light as a function of the location of the extracted light along the first direction. As another example, optics system 402 or similar optics system may include an array of optical elements arranged at different locations along the first direction and configured to induce a different measure of diffusion of extracted light as a function of the location of the extracted light along the first direction. As another example, optics system 402 or similar optics system may include an array of optical elements arranged at different locations along the first direction and configured to induce a different polarization of extracted light as a function of the location of the extracted light along the first direction. As another example, optics system 402 or similar optics system may include an array of optical elements arranged at different locations along the first direction and configured to induce a different degree of convergence, divergence, or collimation of extracted light as a function of the location of the extracted light along the first direction. As another example, optics system 402 or similar optics system may include an array of optical elements arranged at different locations along the first direction and configured to induce a different measure of intensity of extracted light as a function of the location of the extracted light along the first direction.

FIG. 5 is a cross-sectional side view of a controllable light propagation system 500 including the example light system 200 shown in FIGS. 2A-2B, and including an example optics system 502 for selectively steering extracted light. The example optics system 502 includes an array of optical elements 504, each including a reflective surface 506, to reflect extracted light back through the LC element 210 in different steered directions.

For example, as shown in FIG. 5, the array of optical elements 504 includes (a) a reflective element 504a (e.g., a prism including a reflective surface 506) arranged at a first optical element location corresponding with extracted light light $L_{e-a}$ extracted by activation of electrode 215a (as discussed above with respect to FIG. 3A) and (b) a second reflective element 504c (e.g., another prism including a reflective surface 506) arranged at a second optical element location (downstream of the reflective element 504a along the first direction) corresponding with extracted light light $L_{e-c}$ extracted by activation of electrode 215c (as discussed above with respect to FIG. 3B). The reflective element 504a steers extracted light light $L_{e-a}$ along a propagation angle $\alpha_a$, whereas the reflective element 504c steers extracted light $L_{e-c}$ along a different propagation angle $\alpha_c$.

In this manner, the controllable light propagation system 500 may selectively and dynamically steer extracted light along any of multiple different directions, e.g., corresponding with different optical elements 504 for steering light extracted at different locations along the light guide 202 by selective activation of electrodes 215 (e.g., electrodes 215a-215d) arranged along the light guide 202. For example, control circuitry 230 may activate electrodes 215a and 215c concurrently, to extract and propagate respective portions of incident light $L_i$ along propagation angles $\alpha_a$ and $\alpha_c$. Control circuitry 230 may independently activate electrodes 215a and 215c with similar or different voltages, e.g., to control a respective amount of extracted light light $L_{e-a}$ relative to extracted light $L_{e-c}$ and propagate respective portions of incident light $L_i$ along propagation angles $\alpha_a$ and $\alpha_c$. As another example, control circuitry 230 may selectively activate electrode 215a at a first time (e.g., without activating electrode 215c), to extract incident light $L_i$ and propagate extracted light light $L_{e-a}$ (after reflection by reflective element 504a) along propagation angle $\alpha_a$, and subsequently selectively activate electrode 215c at a second time (e.g., without activating electrode 215a), to extract and incident light $L_i$ and propagate extracted light light $L_{e-c}$ (after reflection by reflective element 504c) along propagation angle $\alpha_c$.

As discussed above, a controllable light propagation system according to the present disclosure may selectively activate respective electrodes in an electrode array to reorient the LC molecules in a local region of LC element near the activated electrode(s), which may alter a refractive index of the local LC region, which may in turn allow or influence an extraction of light from the light guide. In some embodiments, various interrelated parameters of the controllable light propagation system may be selected or configured to achieve desired effects (e.g., light extraction locations, magnitudes, steering directions, etc.) in response to defined activation of respective electrodes. Such parameters may include (a) selection of a particular type of LC material for the LC element (e.g., nematic liquid crystals, dual frequency nematic liquid crystals, etc.), (b) a pre-configuration of the LC material, e.g., to orient the LC molecules in a particular non-excited orientation, (c) the location of electrodes relative to the LC element, and/or (d) the polarization of light to be propagated through the light guide (i.e., the direction of light wave oscillation, perpendicular to the propagation direction), to achieve desired effects (e.g., light extraction effects). In some embodiments, a particular type of LC material may be selected and optionally pre-configured orient the LC molecules in a particular non-excited orientation based on the location of electrodes relative to the LC element and the intended polarization of light to be propagated through the light guide, to achieve desired control of light extraction from the light guide.

FIGS. 6A-6F and 7A-7F illustrate two example configurations of such light system parameters, and resulting operational effects. It should be understood that FIGS. 6A-6F and 7A-7F are simplified schematics representing example activation and orientation of LC molecules in example configurations; in actual practice the orientation/reorientation of LC molecules may be very complex in multiple directions.

First, FIGS. 6A-6F illustrate an example controllable light propagation system 600 (similar to light system 200 discussed above with respect to FIGS. 2A-2B and 3A-3B) having a first example configuration. As shown, the example controllable light propagation system 600 includes a light guide 202, a dynamically controllable LC element 210, an array of electrodes, of which two electrodes 215a and 215b are shown, and an outer substrate 226. The LC element 210 includes an LC material 212, e.g., a nematic liquid crystal mixture, comprising LC molecules 602 having a pre-configured (non-excited) orientation extending along the y-direction. In this example, light propagated along light guide 202 has a light wave oscillation in the y-z plane, indicated by arrows Ow.

Figure 6A:
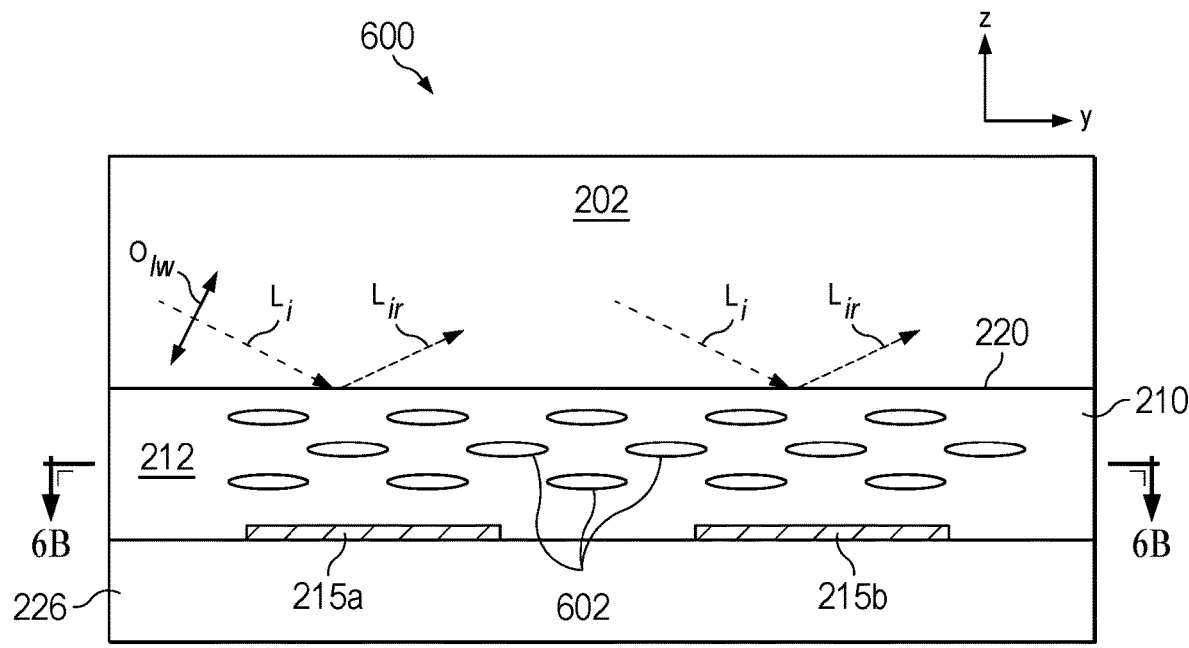
FIGS. 6A-6F illustrate a first example of LC molecule orientation and reorientation responsive to selective electrode activation, and resulting optical effects, in the example controllable light propagation system of FIGS. 2A-2B, according to one embodiment.
Figure 6B:
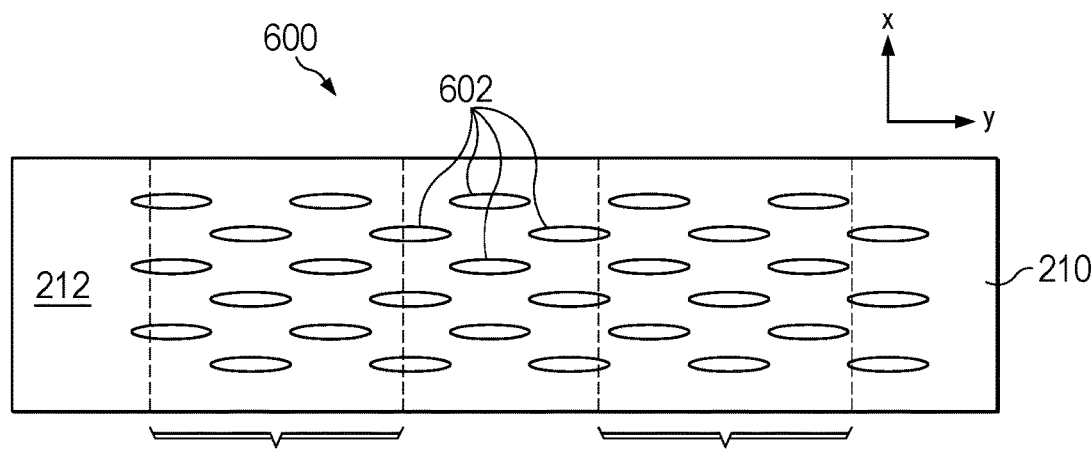
Figure 6C:
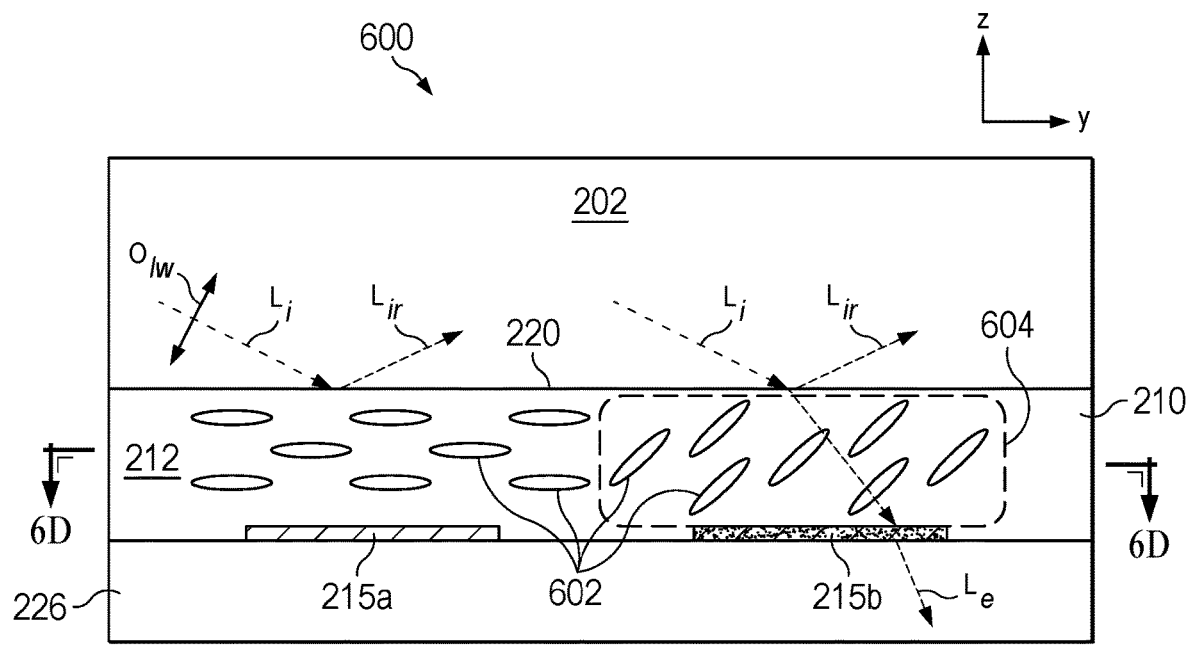
Figure 6D:
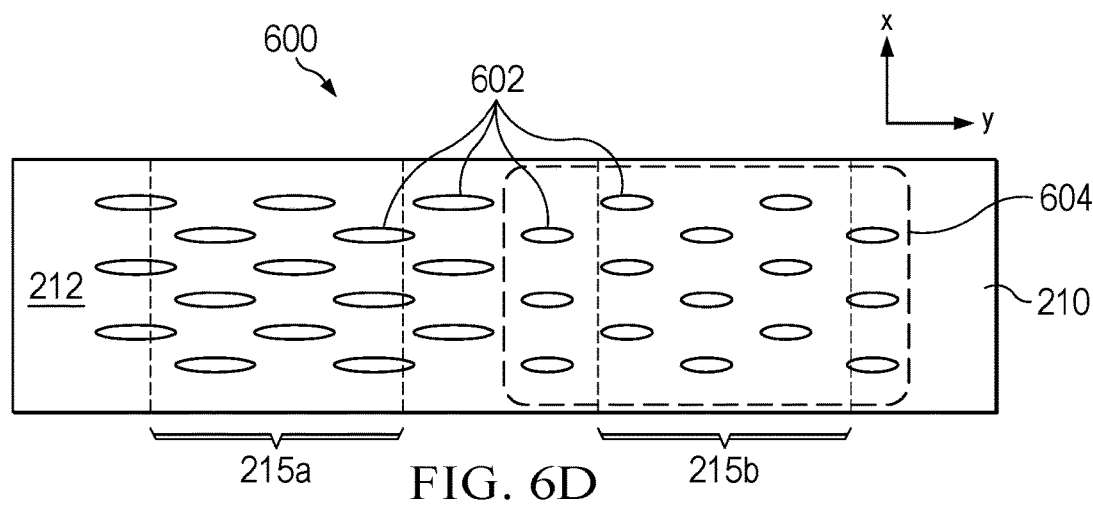
Figure 6E:
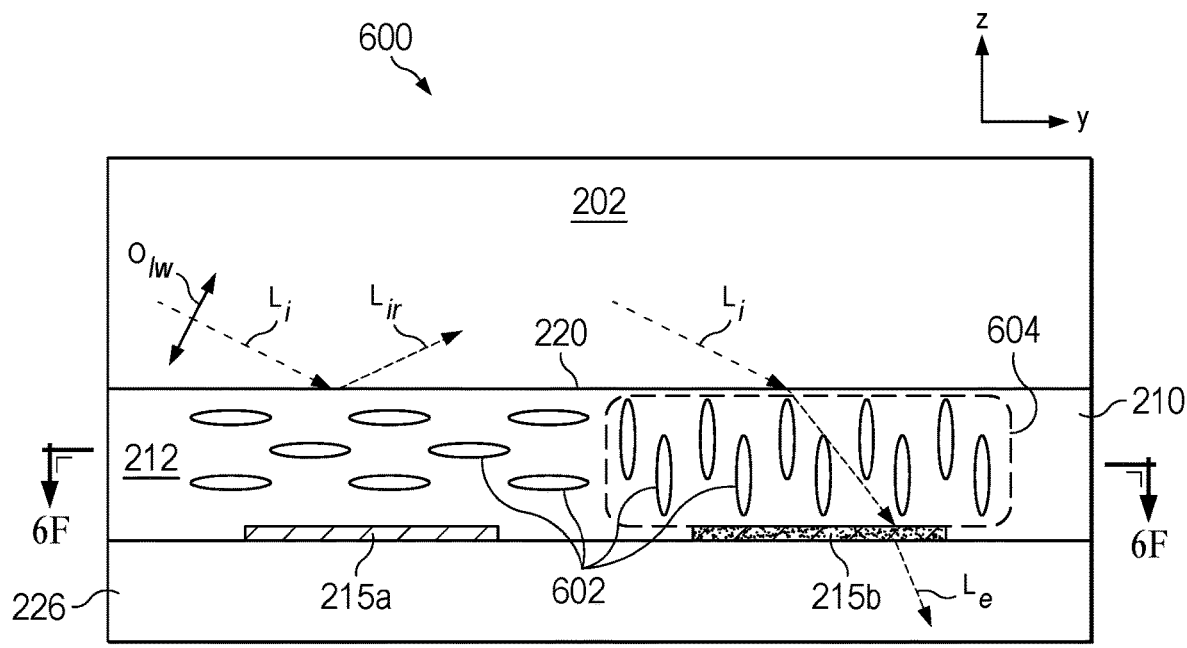
Figure 6F:
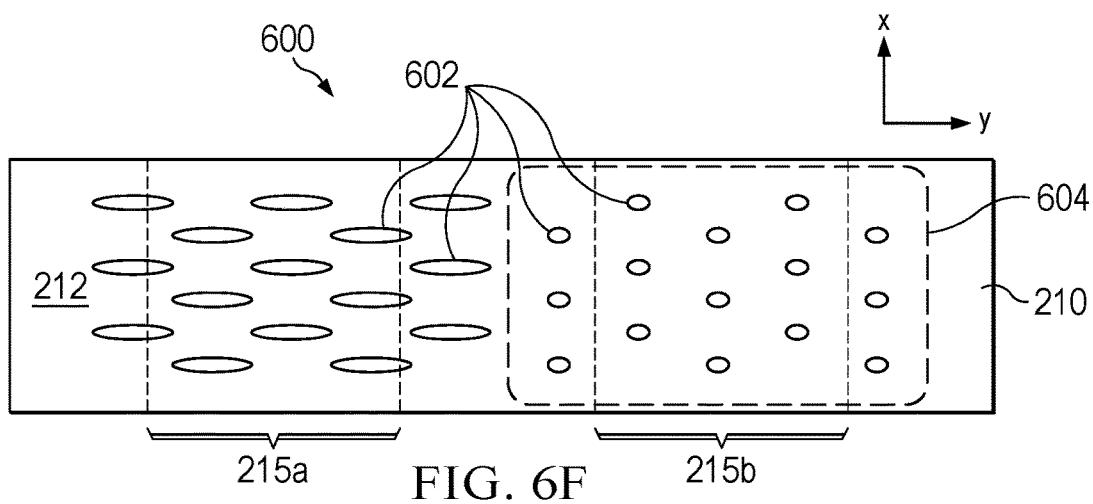

FIG. 6A (cross-sectional side view) and FIG. 6B (top view of the LC element 210) show the LC molecules 602 in a non-excited state, FIGS. 6C and 6D show a region of the LC molecules 602 proximate electrode 215b in a partially excited state, and FIGS. 6E and 6F show the region of the LC molecules 602 proximate electrode 215b in a fully excited state (e.g., in response to a second voltage applied to electrode 215b).

As shown in FIGS. 6A and 6B, the unexcited LC molecules 602 extend in the y-direction, and incident light $L_i$ at the dynamic interface 220 is internally reflected, indicated at $L_{ir}$.

As shown in FIGS. 6C and 6D, when a first voltage is applied to electrode 215b, an electric field generated in the LC material 212 may cause the LC molecules 602 in a local LC region 604 near the electrode 215b to reorient in the y-z plane, increasing a reflective index of the local LC region 604 and resulting in a partial extraction of light, indicated at indicated at $L_e$.

As shown in FIGS. 6E and 6F, when a first voltage is applied to electrode 215b, an electric field generated in the LC material 212 may cause the LC molecules 602 in a local LC region 604 near the electrode 215b to further reorient in the y-z plane, further increasing a reflective index of the local LC region 604 to match a reflective index of the light guide 202, resulting in a full extraction of light, indicated at indicated at $L_e$.

FIGS. 7A-7F illustrate another example controllable light propagation system 700 (similar to light system 200 discussed above with respect to FIGS. 2A-2B and 3A-3B) having a second example configuration. Like the example controllable light propagation system 600 discussed above, the example controllable light propagation system 700 includes a light guide 202, a dynamically controllable LC element 210, an array of electrodes, of which two electrodes 215a and 215b are shown, and an outer substrate 226. The LC element 210 includes an LC material 212, e.g., dual frequency nematic liquid crystals, comprising LC molecules 602 having a pre-configured (non-excited) orientation extending along the y-direction. In this example, light propagated along light guide 202 has a light wave oscillation in the x-y plane (i.e., into the paper), indicated at $O_{lw}$.

Figure 7A:
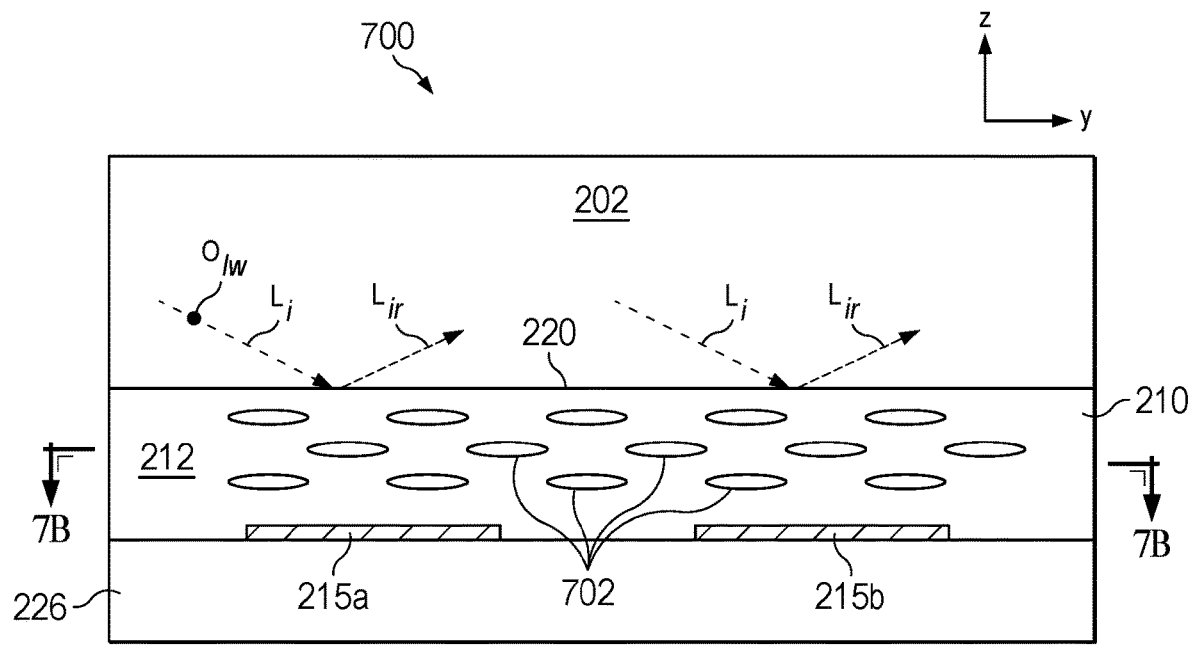
FIGS. 7A-7F illustrate second example of LC molecule orientation and reorientation responsive to selective electrode activation, and resulting optical effects, in the example controllable light propagation system of FIGS. 2A-2B, according to one embodiment.
Figure 7B:
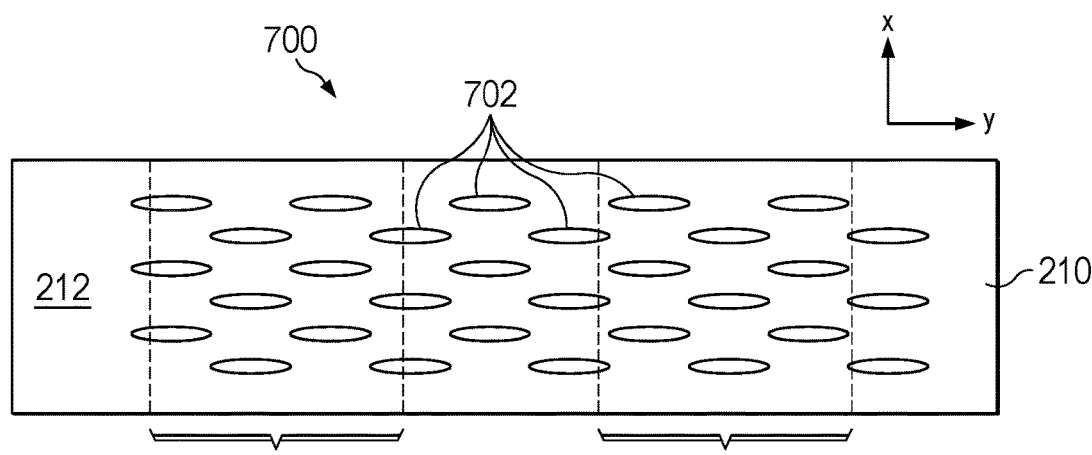
Figure 7C:
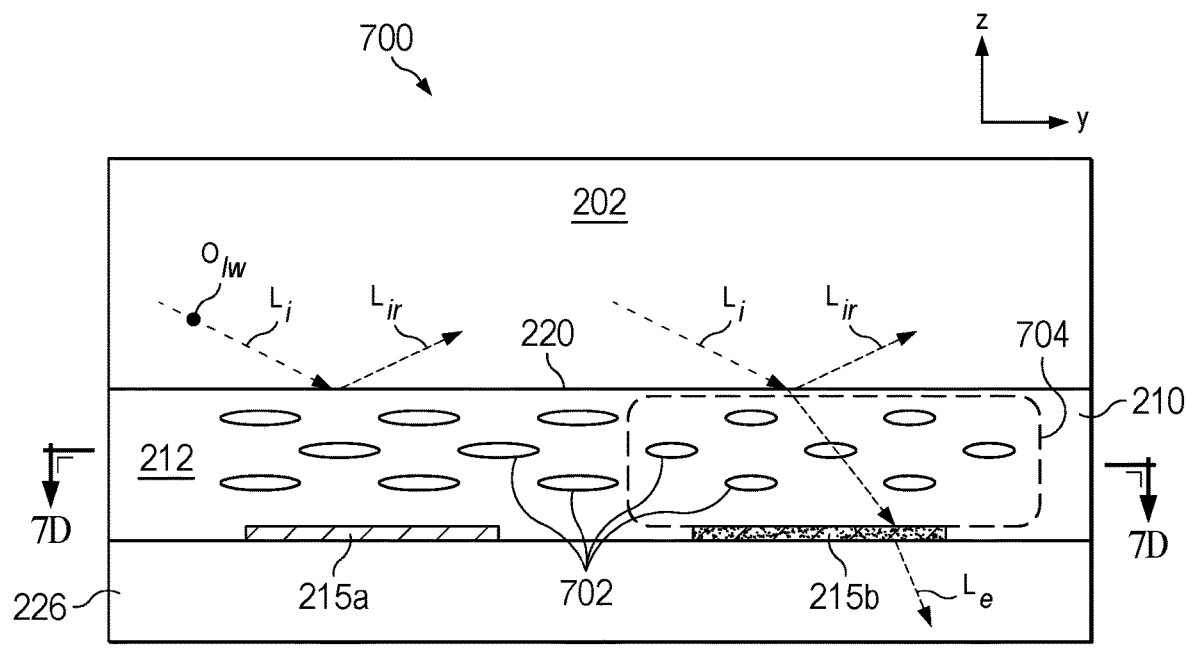
Figure 7D:
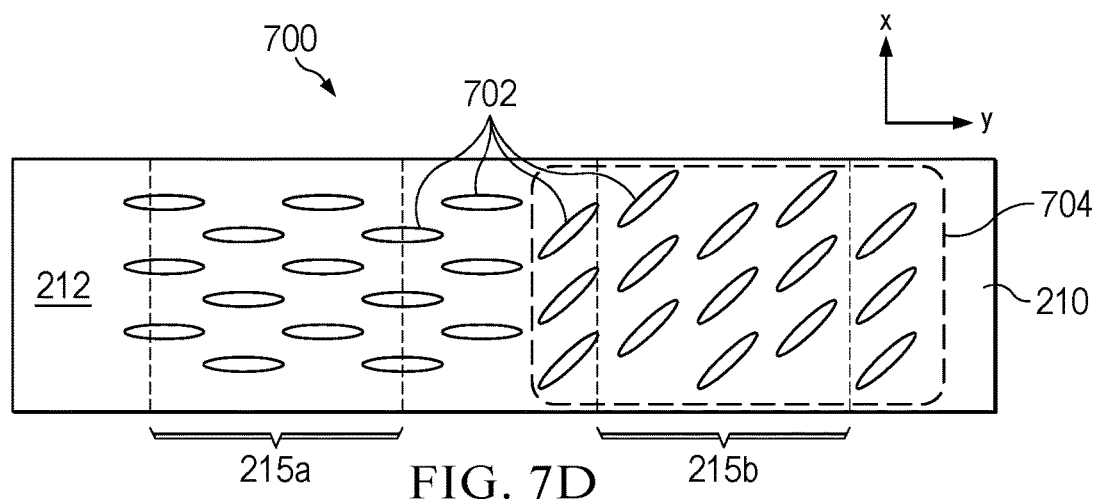
Figure 7E:
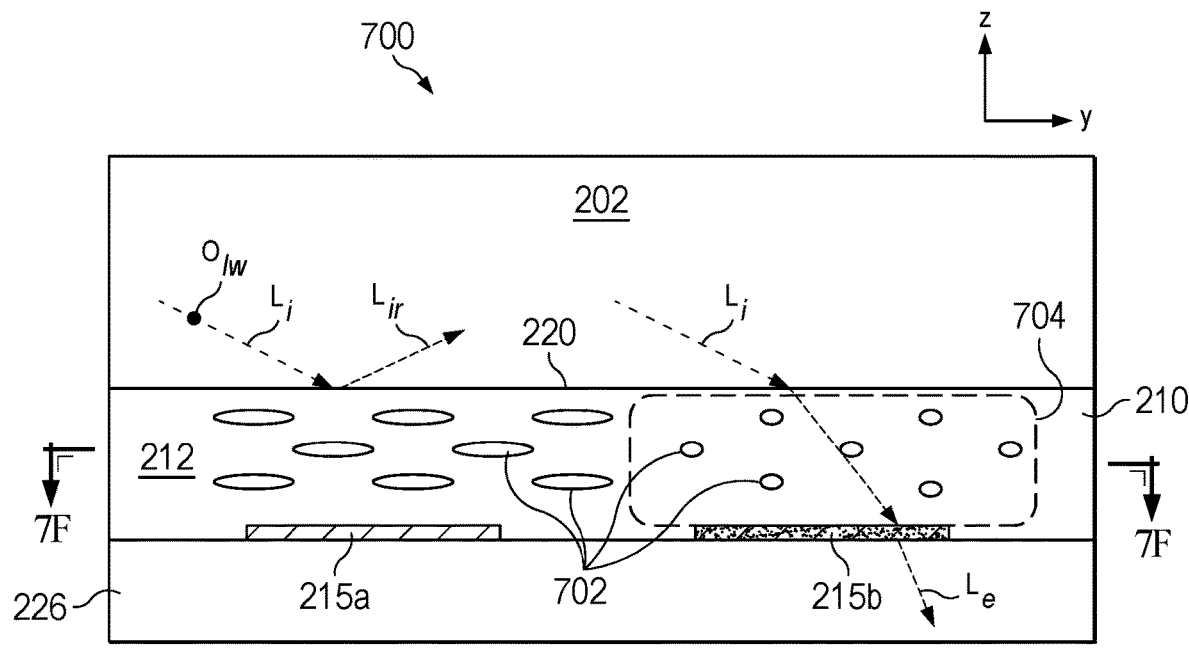
Figure 7F:
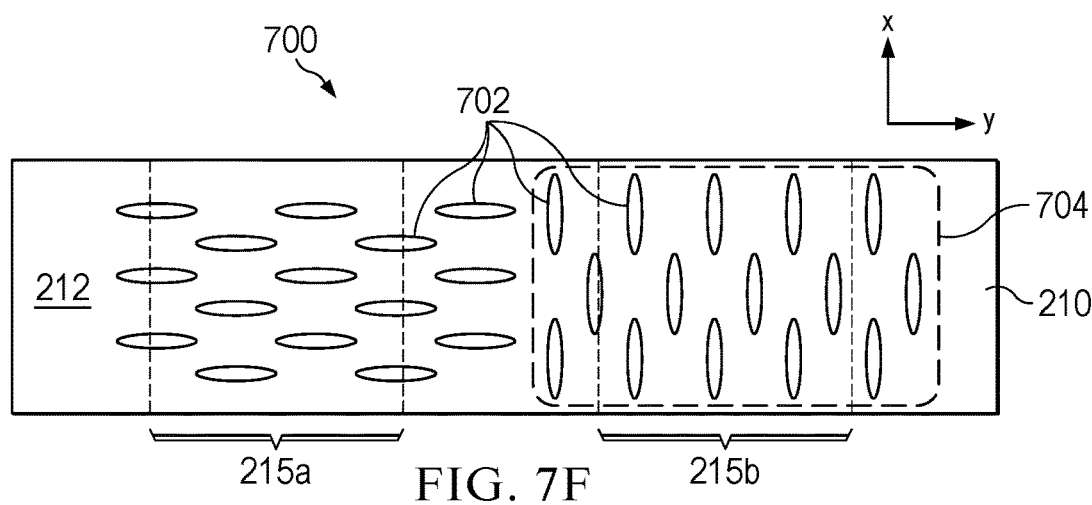

FIG. 7A (cross-sectional side view) and FIG. 7B (top view of the LC element 210) show the LC molecules 702 in a non-excited state, FIGS. 7C and 7D show a region of the LC molecules 702 proximate electrode 215b in a partially excited state, and FIGS. 7E and 7F show the region of the LC molecules 702 proximate electrode 215b in a fully excited state (e.g., in response to a second voltage applied to electrode 215b).

As shown in FIGS. 7A and 7B, the unexcited LC molecules 702 extend in the y-direction, and incident light $L_i$ at the dynamic interface 220 is internally reflected, indicated at $L_{ir}$.

As shown in FIGS. 7C and 7D, when a first voltage is applied to electrode 215b, an electric field generated in the LC material 212 may cause the LC molecules 702 in a local LC region 704 near the electrode 215b to reorient in the x-y plane, increasing a reflective index of the local LC region 704 and resulting in a partial extraction of light, indicated at indicated at $L_e$.

As shown in FIGS. 7E and 7F, when a first voltage is applied to electrode 215b, an electric field generated in the LC material 212 may cause the LC molecules 702 in a local LC region 704 near the electrode 215b to further reorient in the x-y plane, further increasing a reflective index of the local LC region 704 to match a reflective index of the light guide 202, resulting in a full extraction of light, indicated at indicated at $L_e$.

The invention claimed is:

1. A controllable light propagation system, comprising:
   a light guide elongated in a first direction;
   a controllable liquid crystal (LC) element including an LC material, the controllable LC element having a first side adjacent a first side of the light guide to define a dynamic interface between the light guide and the controllable LC element;
   a first array of electrodes arranged at different locations along the first direction;
   wherein respective electrodes of the first array of electrodes at different locations along the first direction are selectively activatable to selectively influence associated regions of the LC material at different locations along the first direction to selectively control a transmissivity of the dynamic interface at different locations along the first direction, thereby allowing a selective extraction of light from the light guide at different locations along the first direction;
   an array of optical elements arranged along the first direction, wherein the array of optical elements are configured to influence light extracted from the light guide;
   wherein respective optical elements in the array of optical elements at different locations along the first direction induce different optical influence on incident light, such that light extracted from the light guide and incident on a respective optical element as a result of selective activation of a respective electrode is optically influenced as a function of a location of the respective optical element along the first direction;
   such that an optical influence on light extracted from the light guide is dynamically controllable by selective activation of different electrodes in the first array of electrodes.

2. The controllable light propagation system of claim 1, wherein a transmissive state of the dynamic interface allows an extraction of light from the light guide into the controllable LC element through the first side of the controllable LC element and out of the controllable LC element through a second side of the controllable LC element opposite the first side of the controllable LC element.

3. The controllable light propagation system of claim 1, wherein:
   the first array of electrodes includes (a) a first electrode at a first electrode location and (b) a second electrode at a second electrode location downstream of the first electrode location along the first direction;
   the first electrode is selectively activatable to control a first electric field influencing a first region of the LC material to thereby control a transmissivity of a first region of the dynamic interface; and
   the second electrode is selectively activatable to control a second electric field influencing a second region of the LC material downstream of the first region of the LC material along the first direction, to thereby control a transmissivity of a second region of the dynamic interface downstream of the first region of the dynamic interface.

4. The controllable light propagation system of claim 1, wherein respective electrodes in the first array of electrodes are independently activatable.

5. The controllable light propagation system of claim 1, wherein the first array of electrodes includes transparent electrodes allowing transmission of light therethrough.

6. The controllable light propagation system of claim 1, wherein the first array of electrodes are arranged on the second side of the controllable LC element.

7. The controllable light propagation system of claim 6, including a second array of selectively activatable electrodes arranged along the first direction on the first side of the controllable LC element.

8. The controllable light propagation system of claim 1, wherein the array of optical elements are configured to deflect light received from the second side of the controllable LC element.

9. The controllable light propagation system of claim 1, wherein the array of optical elements are configured to reflect the extracted light back through the controllable LC element.

10. The controllable light propagation system of claim 1, wherein the array of optical elements arranged along the first direction includes different optical elements that deflect incident light by different degrees, such that light extracted from the light guide and incident on respective optical elements in the array of optical elements is deflected by a variable degree as a function of a location of the extracted light along the first direction, such that an angular deflection of light extracted from the light guide is dynamically controllable by selective activation of different electrodes in the first array of electrodes.

11. The controllable light propagation system of claim 1, wherein the array of optical elements includes:
   a first optical element adjacent the second side of the controllable LC element at a first optical element location; and
   a second optical element adjacent the second side of the controllable LC element at a second optical element location downstream of the first optical element location along the first direction;
   wherein the first optical element is configured to deflect extracted light received from the controllable LC element by a first angular degree; and
   wherein the second optical element is configured to deflect extracted light received from the controllable LC element by a second angular degree different than the first angular degree.

12. The controllable light propagation system of claim 1, wherein the light guide is free of LC material.

13. A controllable light propagation system, comprising:
   a light guide elongated in a first direction;
   a controllable liquid crystal (LC) element having a first side adjacent a first side of the light guide to define a dynamic interface between the light guide and the controllable LC element, the controllable LC element including an LC material;
   a first array of electrodes including (a) a first electrode at a first electrode location and (b) a second electrode at a second electrode location downstream of the first electrode location along the first direction;
   wherein the first electrode is selectively activatable to influence a first region of the LC material to extract a first light beam from the light guide into the controllable LC element via the dynamic interface, at a first location along the first direction; and
   wherein the second electrode is selectively activatable to influence a second region of the LC material to extract a second light beam from the light guide into the controllable LC element via the dynamic interface, at a second location downstream of the first location along the first direction;
   an array of optical elements arranged along the first direction, the array of optical elements including (a) a first optical element at a first optical element location and (b) a second electrode at a second optical element location downstream of the first optical element location along the first direction;
   wherein the first optical element at the first optical element location is configured to receive the first light beam extracted by activation of the first electrode and deflect the extracted first light beam by a first angular degree; and
   wherein the second optical element at the second optical element location is configured to receive the second light beam extracted by activation of the second electrode and deflect the extracted second light beam by a second angular degree different than the first angular degree;
   such that an angular deflection of light extracted from the light guide is dynamically controllable by selective activation of the first and second electrodes.

14. The controllable light propagation system of claim 13, comprising control circuitry to selectively activate respective electrodes in the first array of electrodes to control an extraction of light at different locations along the light guide in the first direction.

15. The controllable light propagation system of claim 13, comprising control circuitry to control a voltage to a respective electrode in the first array of electrodes to effect a partial extraction of light, with an internal reflection in the light guide of non-extracted light, at a selected location along the first direction.

16. A method for controlling light propagation, comprising:
   operating a controllable light propagation system including:
      a light guide elongated in a first direction;
      a controllable liquid crystal (LC) element including an LC material, the controllable LC element having a first side adjacent a first side of the light guide to define a dynamic interface between the light guide and the controllable LC element;
      an array of electrodes arranged at different locations along the first direction; and
      the controllable light propagation system includes (a) a first optical element at a first optical element location and configured to deflect extracted light by a first angular degree, and (b) a second optical element at a second optical element location downstream of the first optical element location along the first direction and configured to deflect extracted light by a second angular degree different than the first angular degree;
   at a first time, using the controller to selectively activate at least one first electrode of the array of electrodes to effect a selective extraction of light from the light guide at a first location associated with the first optical element location, wherein the first optical element deflects the extracted light by the first angular degree; and
   at a second time after the first time, using the controller to selectively activate at least one second electrode of the array of electrodes to effect a selective extraction of light from the light guide at a second location associated with the second optical element location, wherein the second optical element deflects the extracted light by the second angular degree;
   such that an angular deflection of light extracted from the light guide is dynamically controllable by selective activation of the at least one first electrode and the at least one second electrode.

* * * * *